US008799041B2

(12) United States Patent
Santos et al.

(10) Patent No.: US 8,799,041 B2
(45) Date of Patent: Aug. 5, 2014

(54) CALCULATING AN AMOUNT OF ENTERPRISE RESOURCE TO BE ASSIGNED BASED ON RECEIVED PARAMETERS

(75) Inventors: Cipriano A. Santos, Modesto, CA (US); Andrei Fuciec, Geneva (CH); Dirk M. Beyer, Walnut Creek, CA (US); Joachim Resch, Bad Fallingbostel (DE); Ernesto Brau, Tucson, AZ (US); Shailendra Jain, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2645 days.

(21) Appl. No.: 11/590,110

(22) Filed: Oct. 31, 2006

(65) Prior Publication Data

US 2008/0103848 A1 May 1, 2008

(51) Int. Cl.
*G06Q 10/00* (2012.01)
*G06Q 10/06* (2012.01)

(52) U.S. Cl.
CPC ............ *G06Q 10/06* (2013.01); *G06Q 10/0631* (2013.01); *G06Q 10/06312* (2013.01)
USPC ....................................... 705/7.12; 705/7.36

(58) Field of Classification Search
CPC ................................................ G06Q 10/0631
USPC ....................................................... 705/7–9
See application file for complete search history.

(56) References Cited

U.S. PATENT DOCUMENTS

| 6,732,079 | B1 * | 5/2004 | Kintner et al. ..................... 705/8 |
| 2002/0178095 | A1 * | 11/2002 | Vellante et al. ................. 705/30 |
| 2002/0184069 | A1 * | 12/2002 | Kosiba et al. ..................... 705/8 |
| 2004/0039619 | A1 * | 2/2004 | Zarb ................................ 705/7 |
| 2004/0162753 | A1 | 8/2004 | Vogel et al. |
| 2005/0049911 | A1 * | 3/2005 | Engelking et al. .............. 705/11 |
| 2005/0131754 | A1 * | 6/2005 | Chapman et al. ............... 705/10 |
| 2006/0080156 | A1 * | 4/2006 | Baughn et al. ..................... 705/7 |
| 2006/0106637 | A1 | 5/2006 | Johnson et al. |
| 2007/0162321 | A1 * | 7/2007 | Behrmann et al. ................ 705/9 |
| 2008/0126151 | A1 * | 5/2008 | Peynaud et al. ................... 705/7 |

OTHER PUBLICATIONS

"Modis Expands in Florida and Texas." PR Newswire, Sep. 26, 2006.*
Gareiss, et al. "Analyzing the Outsourcers." Information Week, 915, p. 30, Nov. 18, 2002.*

* cited by examiner

*Primary Examiner* — Susanna M Meinecke Diaz

(57) ABSTRACT

A tool receives parameters relating to target enterprise objective of an enterprise, the cost of an enterprise resource associated with the enterprise, and an enterprise resource capacity. The tool calculates an amount of an enterprise resource to be assigned in an enterprise based on the received parameters relating to the target enterprise objective, the enterprise resource cost, and the enterprise resource capacity.

16 Claims, 3 Drawing Sheets

CALCULATING AN AMOUNT OF ENTERPRISE RESOURCE TO BE ASSIGNED BASED ON RECEIVED PARAMETERS

BACKGROUND

A business enterprise can have many locations (locations in different areas of the country or in different countries), practices (e.g., different software practices such as Java or SAP (Systems Applications and Products)), and market offerings (services and/or products offered by the business enterprise). The different locations, practices, and market offerings can make up various organizations within the enterprise. Also, the business enterprise can have a large multi-skilled workforce, where the workforce can include employees, contractors, offshore providers, and/or third-party partners.

Periodically, the business enterprise can set target revenues for various organizations of the business enterprise. A challenge faced by the business enterprise is to properly plan for such target revenues. Planning involves determining whether the target revenues can be met with the workforce that each organization has available.

Typically, the planning process is performed manually, with the goal of identifying workforce gaps. Once workforce gaps are identified, planners manually fill these gaps, such as by use of offshore resources or other external workers (third-party partners or contractors). Conventionally, the manual process of filling gaps in the workforce focuses primarily on meeting target revenues, while generally other factors such as costs of delivery and profitability of the business enterprise are ignored. Consequently, although target revenues of the business enterprise may be achieved by filling workforce gaps, the profitability of the business enterprise may actually be adversely affected.

BRIEF DESCRIPTION OF THE DRAWINGS

Some embodiments of the invention are described with respect to the following figures.

DETAILED DESCRIPTION

Figure 1:
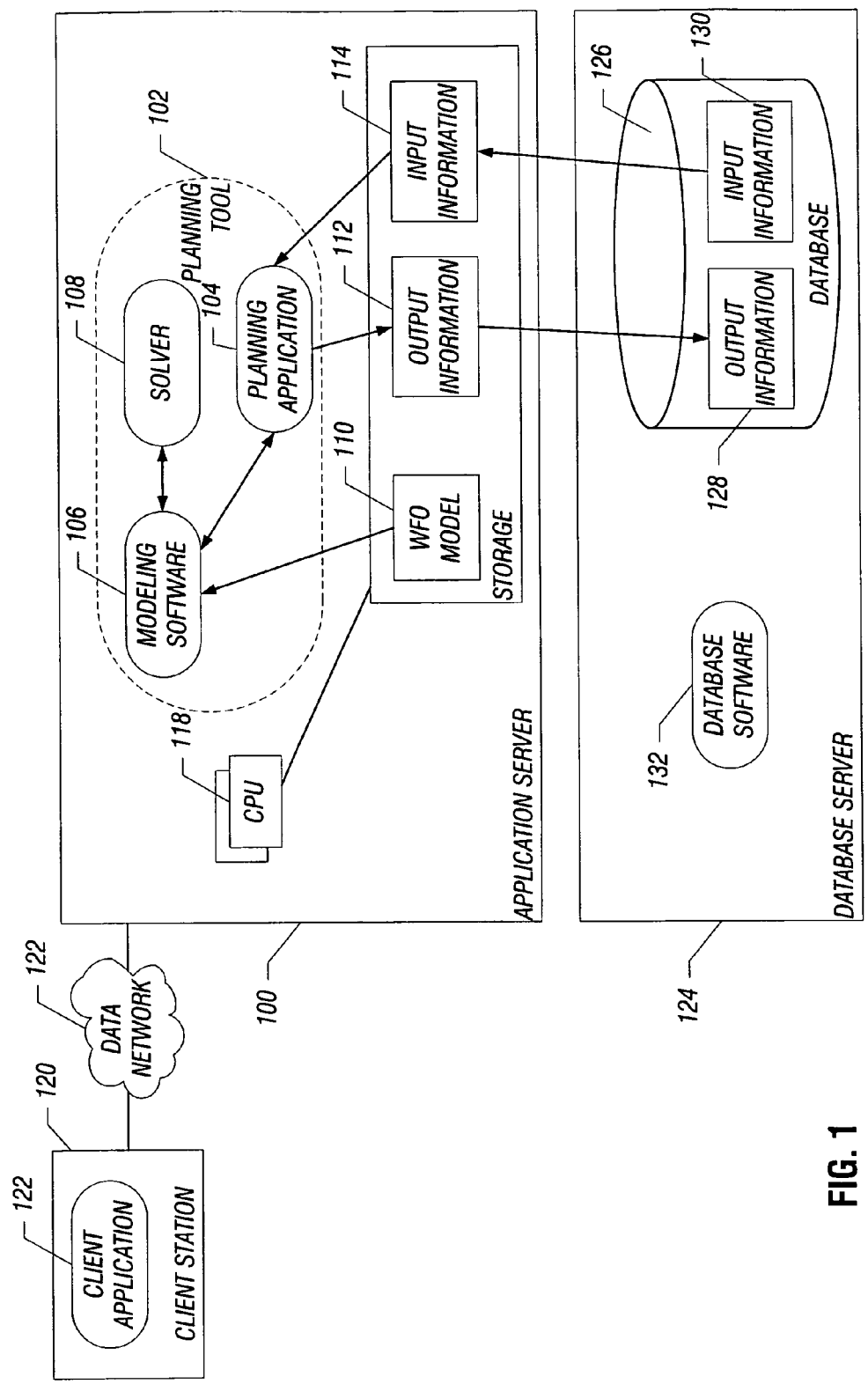
FIG. 1 is a block diagram of an example arrangement that includes an application server containing a planning tool according to some embodiments.

In accordance with some embodiments, an automated workforce planning technique is provided in which a planning tool is used for automatically assigning or allocating workforce for an enterprise based on various factors, including target revenue of the enterprise, costs, and other factors. By considering costs, the automated workforce planning allows an enterprise to meet target revenues while enhancing profitability of the enterprise. Examples of an enterprise include a business enterprise (such as a company or other provider of goods and services), an educational organization, or a government agency. A target revenue of an enterprise refers to a target revenue of the entire enterprise, or the target revenue of a portion of the enterprise. In the business context, target revenue refers to the revenue received from forecast purchase orders of the business enterprise. In the educational context, the target revenue can be tuition received from students, and in the governmental context, the target revenue can be government fees collected from users. Other target objectives may also be considered, such as a target number of students per year in the educational context, or a target number of filings by taxpayers or other users in a governmental context. Such target objective in the educational or government context can be used to perform workforce planning to allocate a workforce (e.g., teachers, instructors, researchers, technicians, teaching assistants, government workers, etc.) of the enterprise, based on various factors, including costs and other factors. More generally, target revenue, target number of students, target number of government filings, and so forth, can each generally be referred to as a "target enterprise objective" associated with the particular enterprise. The target enterprise objective is based on a forecast activity of the organization, such as forecast orders, forecast number of incoming students, or forecast number of incoming filings. The automated workforce planning technique that is used for automatically assigning or allocating workforce for an enterprise is based on such target incoming amount associated with the enterprise, along with other factors such as costs, internal workforce capacity, and/or workforce training opportunities, while maximizing or enhancing workforce utilization and enterprise gross margins.

In the ensuing discussion, reference is made to performing workforce allocation given a target revenue—note that similar techniques can be applied to other target enterprise objectives. Also, note that instead of performing workforce allocation or planning to allocate workforce associated with an enterprise, other embodiments can perform other forms of enterprise resource planning, such as planning regarding allocation of equipment (e.g., amount of computers, mobile phones, etc., to allocate to employees, amount of manufacturing equipment to allocate, and so forth) or other resources of the organization. Thus, more generally, enterprise resource planning considers a target enterprise objective (e.g., target revenue), enterprise resource costs (e.g., workforce costs, equipment costs, costs of other resources, etc.), and enterprise resource capacity (e.g., workforce capacity, equipment capacity, etc.). "Enterprise resource capacity" refers to the availability and capability of the enterprise resource. An "enterprise resource" refers to a resource (e.g., workforce, equipment, etc.) associated with an enterprise, where the resource is allocated to achieve the target enterprise objective. The techniques discussed below with respect to workforce planning can be applied to other forms of enterprise resource planning.

The planning tool according to some embodiments uses a workforce optimization model (such as a linear programming (LP) model), which maximizes total gross margin and the enterprise internal workforce utilization for some predefined period of time (next six months, a year, two years, etc.), while considering various factors, including internal workforce capacity, cross-training costs, and external workforce costs. The term "internal workforce" refers to employees of the enterprise. The term "external workforce" refers to any one or more of contractors (also referred to a contingent workforce), offshore personnel (personnel provided by overseas vendors), and personnel of third-party partners (personnel of business partners of the enterprise). More generally, business partners and/or offshore vendors can be more generically referred to as "outside vendors." Since the internal workforce of an enterprise is considered a sunk cost (a cost that has already been incurred and cannot be reversed), maximizing utilization of such internal workforce reduces the incurring of additional costs associated with increased usage of an external workforce.

For given target revenues, costs, and workforce capacities, the workforce optimization model determines the target revenue allocation factors to various workforce sources (internal and external). A target revenue allocation factor specifies the amount of revenue to be allocated to each workforce source. Also, the workforce optimization model provides a cost-effective matching of workforce requirements with internal workforce, external workforce, or workforce that can be achieved by performing cross-training (where cross-training refers to cross-training an employee that is in a particular role to fill another role). In other words, the workforce optimization model is able to allocate people with the correct skills to the corresponding market offering and make recommendations about training some employees for new skills.

The workforce optimization model is thus able to emphasize profitability of the enterprise by increasing gross margins and explicitly considering operating costs. Also, the planning tool according to some embodiments that utilize the workforce optimization model is able to automate the workforce gap-filling process by identifying and closing gaps with least cost (or lower cost) workforce resources. Also, the workforce optimization model emphasizes feasibility by considering internal workforce capacity and cross-training opportunities. "Internal workforce capacity" refers to availability and capability of the internal workforce of an enterprise, where availability and capability are determined by an available inventory of internal workforce members (employees) according to role, geography, practice, and market offering. If workforce gaps cannot be filled with internal workforce (in other words, the internal workforce capacity is exceeded), then the least cost alternative from among the following is chosen to fill the gap: (1) cross-training; (2) hire additional contingent workforce; and (3) increase revenue allocation to offshore and/or third-party vendors.

FIG. 1 illustrates an example arrangement in which an application server 100 includes a planning tool 102 according to some embodiments. The planning tool 102 in the example implementation of FIG. 1 includes several software modules, including a planning application 104, a modeling software 106, and a solver 108. In some implementations, the modeling software 106 and solver 108 can be off-the-shelf commercial products that can be used in conjunction with the planning application 104 according to some embodiments. For example, the modeling software 106 can be an Optimization Programming Language (OPL) modeling software provided by ILOG, Inc.; and the solver 108 can be the CPLEX solver from ILOG. Other off-the-shelf modeling software and solvers can be used in other implementations. Alternatively, the modeling software 106 and solver 108 can be a custom software The planning application 104 interacts with the modeling software 106 to allow a workforce optimization model 110 to be used for representing a workforce optimization problem. The modeling software 106 invokes the solver 108 to solve the workforce optimization model 110, given input information 114 (including input parameters that are used in the workforce optimization model 110). The workforce optimization model 110 includes various decision variables for which values are assigned by the solver 108, which values of the decision variables are provided as output information 112. Also, the planning application 104 can aggregate or otherwise process the output decision variables of the workforce optimization model 110 to derive other output values that may be useful for inclusion in an output report (or reports) that can be provided to a user. Such output values and/or reports are considered output information 112.

The workforce optimization model 110, input information 114, and output information 112 are depicted as being stored in a storage 116 of the application server 100. The storage 116 is coupled to one or more central processing units (CPUs) 118, on which the planning tool 102 is executable.

The application server 100 is coupled to a client station 120 (or to multiple client stations) over a data network 122. A client station 120 includes a client application 122 that is executable to provide a user interface to allow a user to access the planning tool 102. For example, the client application 122 can present a graphical user interface having graphical control icons selectable by the user to invoke the planning tool 102. Also, the user interface can be used by the user to enter the values of various input parameters that are part of the workforce optimization model 110.

In some implementations, a database server 124 is also coupled to the application server 100. The database server 124 includes a database 126 that contains input information 130 and output information 128. The input information 130 can include the input parameters used by the workforce optimization model 110 in the application server 100, where the input information 130 is loaded into the storage 116 as input information 114 during operation of the planning tool 102. Also, output information 112 generated by the planning tool 102 can be written to the database 126 as output information 128 for more permanent storage and for access by other users. The database server includes database software 132 to manage access (retrieval and updates) of the content of the database 126. Note that the database server 124 can be omitted in other implementations.

Figure 2:
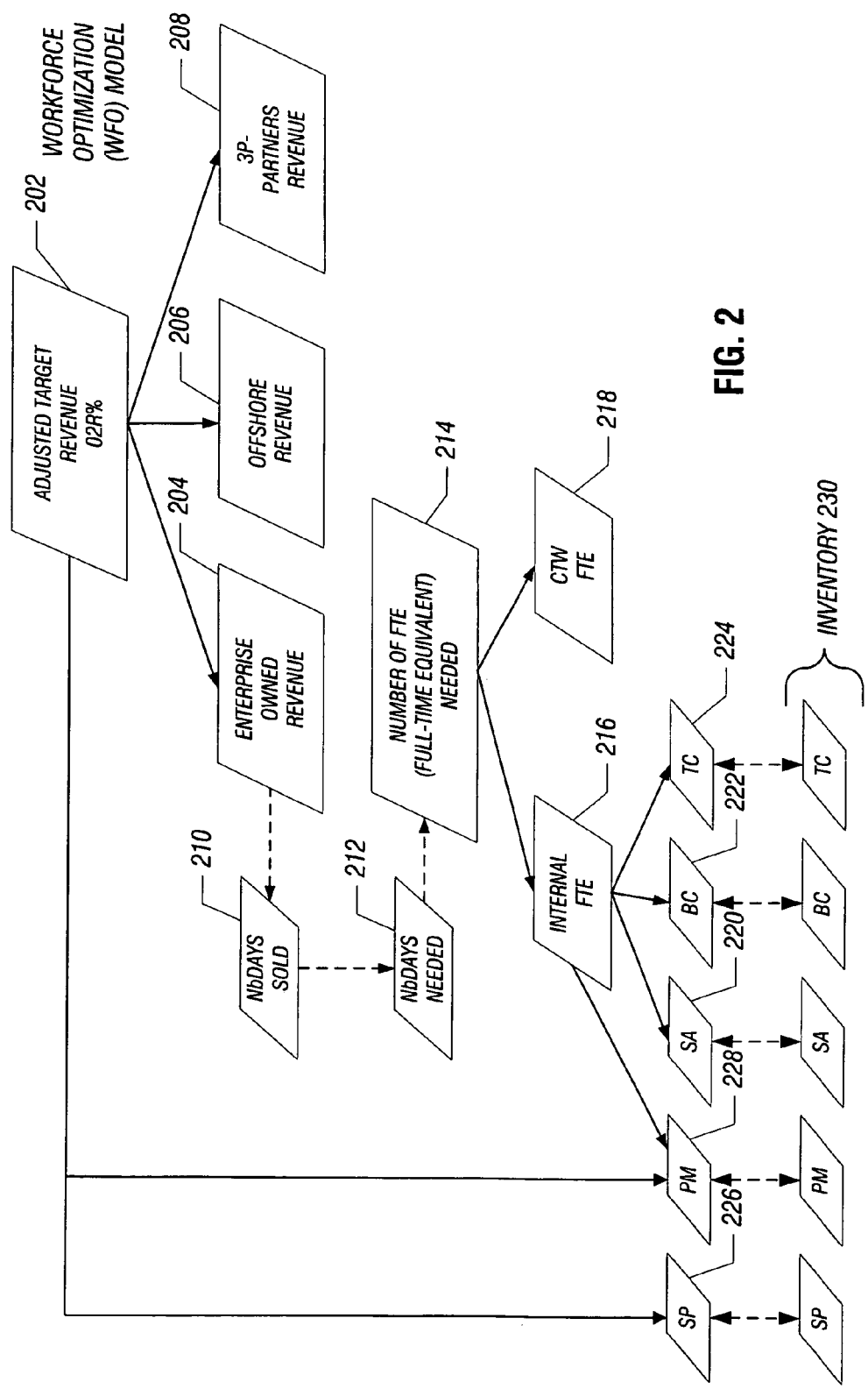
FIG. 2 illustrates a workforce optimization model, in accordance with an embodiment.

FIG. 2 illustrates a workforce optimization model according to an example embodiment. As depicted in FIG. 2, an adjusted target revenue 202 is derived based on forecast orders (e.g., forecast purchase orders) that are expected to be received (during a planning horizon) by the enterprise. An enterprise defines a forecast revenue based on past history of orders, which can be stored in a log (or logs) from previous planning periods, and based on target market share levels. This forecast revenue is adjusted by considering that not all that is sold actually generates income (the adjusted target revenue is represented as 202 in FIG. 2). Note that there are multiple gross target revenues and respective adjusted target revenues corresponding to different market offerings, practices, and geographic areas. Although FIG. 2 refers to adjusted target revenue 202 in the singular sense, it is noted that the workforce optimization model depicted in FIG. 2 is representative of adjusted target revenues (and other parameters and variables discussed below) for different combinations of market offerings, practices, and geographic areas.

Orders may be separated into orders by market offering, practice, and geography. The orders by market offering, practice, and geography are represented with decision variables, referred to as $x4kord_{m,p,g}$, where the subscript m represents market offering (m∈M), the subscript p represents practice (p∈P), and the subscript g represents geography (g∈G). "Geography" refers to the location of some segment of the enterprise, where G is the set that includes all geographic areas of the enterprise. "Market offering" refers to a product and/or service provided by the enterprise to consumers, where M is the set of all market offerings of the enterprise. "Practice" refers to an area of focus of a technology, such as an area focused on usage of a particular development tool, e.g., Java or SAP (Systems Applications and Products), where P is the set of all practices of the enterprise. The enterprise in the above example embodiment can thus be considered to be divided into multiple segments, where each segment corresponds to a particular combination of a specific market offering, practice, and geographic location.

Although reference is made to dividing various parameters and variables of the workforce optimization model by market offering, practice, and geography ("segmenting factors") in the described embodiments, it is noted that the various parameters and variables can be divided by a smaller or larger number of segmenting factors. Alternatively, the workforce optimization model may be focused on the enterprise as a whole.

As indicated by FIG. 2, the adjusted target revenue 202 is produced by multiplying the gross target revenue (computed by summing amounts of forecast orders) by an input factor $FO2R_g$, which represents the order-to-revenue conversion factor by geography (g). For example, the value of $FO2R_g$ can be 95%, which means that the gross revenue derived from the sum of orders for a geographic area g is multiplied by 95% to obtain the adjusted target revenue. The value of $FO2R_g$ is based on historical information indicating that some percentage of orders cannot be fulfilled within a current period (such as back-ordering and other causes). There are multiple $FO2R_g$ values for corresponding different geographic areas.

The adjusted target revenues (202), as adjusted by the order-to-revenue factors $FO2R_g$ are divided into three possible sources: (1) enterprise-owned revenue 204 (revenue derived from the enterprise internal workforce and the contingent workforce); (2) offshore revenue 206 (revenue derived from offshore personnel); and (3) third-party partner revenue 208 (revenue derived from third-party partner personnel). The offshore revenue 206 is based on a variable $xASO_{m,p,g}$, which represents the revenue to be generated by an offshore source according to market offering, practice, and geography. The third-party partner revenue 208 is based on a variable $x3prtnrs_{m,p,g}$, which represents the revenue to be delivered by third-party partners according to market offering, practice, and geography. The remaining portion of the adjusted target revenue 202 (as adjusted by the order-to-revenue factor $FO2R_g$) makes up the enterprise-owned revenue 204.

After the adjusted target revenue 202 has been divided into the three possible sources, including the enterprise-owned revenue 204, the next step is to convert the enterprise-owned revenue 204 to a value representing an amount of workforce (a value represented as 214 that is discussed further below). Based on the enterprise-owned revenue 204, a target number of days sold value 210 is derived. The target number of days sold value 210 is equal to the enterprise-owned revenue 204 divided by the average discounted external rate of the enterprise, which is the monetary amount generated per day of consulting by the enterprise. In one implementation, the average discounted external rate (or consulting rate) is represented as $DRATE_g$. In some implementations, different rates are assigned to different geographic areas (different values of g).

From the target number of days sold value 210, a number of days needed value 212 can be computed, where the number of days needed value 212 is equal to the target number of days to be sold value 210 divided by a percentage value that takes into account internal workforce utilization and percentage of non-billable time. This percentage value is expressed as CORE*(1−FCTW)+(1−BID)*FCTW−RISK), which is explained further below.

From the number of days needed value 212, the value 214 representing a number of FTE (full-time equivalent) needed is derived for each market offering, practice, and geographic area. "Full-time equivalent" refers to an amount of workforce that is the equivalent of a number of full-time employees of the enterprise that are to be allocated or assigned (also referred to as the FTE requirement). The FTE requirement value 214 is represented as variable $xftereq_{m,p,g}$. Note that the number of FTE needed includes both the enterprise's internal workforce as well as the contingent workforce (e.g., contractors).

The workforce optimization model further divides the FTE requirement value 214 between an internal workforce FTE value 216 (represented by variable $xtereq_{m,p,g}^{INT}$ for different market offerings, practices, and geographic areas) and a contingent workforce FTE value 218 (represented by variable $xftereq_{m,p,g}^{CTW}$). Disaggregation of the FTE requirement value 214 into an internal workforce FTE value 216 and contingent workforce FTE value 218 is performed based on $FCTW_{m,p,g}$, which represents the percentage of the total FTE (the FTE requirement value 214) hired as contingent workforce by market offering, practice, and geography. Note that the FTE requirement value 214 does not include the workforce of outside vendors including offshore vendors and third-party partner vendors.

The internal workforce FTE value 216 is further disaggregated into FTE values for different roles. In one example implementation, the number of roles that are employed in the enterprise include a sales principal (SP), a project manager (PM), a solution architect (SA), a business consultant (BC), and a technical consultant (TC). Note that the types of roles listed above are merely provided as examples. In other implementations, there can be a large number of other possible roles that can be employed in an enterprise. A "role" generally refers to the function, responsibility, or job type of each workforce personnel.

In the example of FIG. 2, the internal workforce FTE 216 is divided among a solution architect FTE 220, a business consultant FTE 222, a technical consultant FTE 224, and a project manager FTE 228. In the example of FIG. 2, each of the sales principal FTE 226 and project manager FTE 228 is further derived at least in part from the adjusted target revenue 202. Note that the project manager FTE 228 is thus derived based on both disaggregation of the internal workforce FTE 216 and on the adjusted target revenue 202. The reason that the sales principal FTE 226 and project manager FTE 228 are calculated at least in part from the adjusted target revenue 202 is that each of the sales principal and project manager has an assigned revenue responsibility. Thus, for example, if each sales principal is responsible for $500,000 of revenue, and the adjusted target revenue is $2,000,000, then the sales principal FTE would be four.

For the project manager FTE 228, to handle possible conflicts in calculating the project manager FTE 228 based on both the adjusted target revenue 202 and disaggregation of the internal workforce FTE 216, a variable $xpmextra_{m,p,g}$ is defined (explained further below). The project manager FTE 228, solution architect FTE 220, business consultant FTE 222 and technical consultant FTE 224 are represented by variables $xdrreq_{r,m,p,g}$, where reDR={PM, SA, BC, TC}.

The solution architect FTE 220 is derived from the internal workforce FTE 216 using parameter $FSA_{m,p,g}$, which is the percentage of solution architect FTE needed by market offering, practice, and geography. Similarly, the business consultant FTE 222 is derived from parameter $FBC_{m,p,g}$, which is the percentage of business consultant FTE needed by market offering, practice, and geography. The technical consultant FTE 224 is the remainder of the internal workforce FTE 216 after subtracting out the solution architect FTE 220, business consultant FTE 222 and the project manager FTE 228.

The project manager FTE 228 is derived based on parameter $REVPM_g$ (which represents the average revenue managed by a project manager) and a parameter $FPR_{m,p,g}$ (which represents the percentage of revenue by market offering, practice, and geography for project manager FTE). As noted above, the sales principal FTE 226 (represented as $xndr_g^{INT}$) is derived using the adjusted target revenue 202 and a value representing an average revenue that is the responsibility of the sales principal.

As further depicted in FIG. 2, the sales principal FTE 226, project manager FTE 228, solution architect FTE 220, business consultant FTE 222, and technical consultant FTE 224 come from a workforce inventory represented generally as 230.

The workforce optimization model according to the embodiment depicted in FIG. 2 thus starts with a target revenue (adjusted target revenue 202) and breaks down the target revenue into revenues according to different sources (enterprise-owned revenue 204, offshore revenue 206, and third-party partner revenue 208). Note that the allocation of the revenues according to different sources takes into account various costs. The workforce optimization model attempts to increase the enterprise-owned revenue 204, and in particular, the internal workforce FTE 216, to enhance utilization of the internal workforce. Allocation of revenues to different sources and computing of the various FTE values referred to above are based on solving the workforce optimization model that takes as input various parameters having specific values, and produces as output values of various variables.

The workforce optimization model according to an embodiment is represented as follows:

$$\text{Max}GM = \qquad \text{(Eq. 1)}$$

$$\sum_{m,p,g} FO2R_g * x4kord_{m,p,g} - \sum_{m,p,g} \left( ASORate * xASO_{m,p,g} + PRate * x3prtnrs_{m,p,g} + CTWRate * \eta * \sum_r xdrctw_{m,p,g} \right) -$$

$$\sum_{(m,r),(m',r') \in MRMR} TRAINCOST_{(m,r),(m',r')} * xtrain_{(m,r),(m',r')} +$$

$$FLAGCAP * \varepsilon * \left( \sum_{\substack{r \in DR \\ (m,p,g) \in MPG}} xdrexcess_{r,m,p,g} + \sum_g xspexcess_g \right)$$

The term "GM" stands for gross margin, and the workforce optimization model specifies that the gross margin is to be maximized (or otherwise increased). The gross margin is defined as being the total revenue (sum of the $FO2R_g * x4kord_{m,p,g}$ terms, where each term represents the adjusted target revenue 202 in FIG. 2) less the operational cost, which is represented by all the terms following the minus symbol in Eq. 1. Each variable that begins with "x" in Eq. 1 (and in the following discussion) is a decision variable whose value can be varied when solving the workforce optimization model. The remaining parameters have predefined values.

In the workforce optimization model represented by Eq. 1 above, $$\left( ASORate * xASO_{m,p,g} + PRate * x3prtnrs_{m,p,g} + CTWRate * \eta * \sum_r xdrctw_{m,p,g} \right)$$

represents the operational cost associated with using offshore workforce ($ASORate * xASO_{m,p,g}$), using third-party partner workforce ($PRate * x3prtnrs_{m,p,g}$), and using contingent workforce $$\left( CTWRate * \eta * \sum_r xdrctw_{m,p,g} \right).$$

The parameter $\eta$ represents the number of working days, the parameter CTWRate represents the cost of hiring a contingent workforce on a per-day basis, and $xdrctw_{m,p,g}$ represents the number of contractors to be hired according to market offering, practice, and geography. The parameter ASORate is a percentage value to represent a percentage of the offshore revenue ($xASO_{m,p,g}$) attributable to cost of the offshore workforce; and the parameter Prate is a percentage value to represent a percentage of third-party partner revenue ($x3prtnrs_{m,p,g}$) attributable to cost of the third-party partner workforce. The variable $xASO_{m,p,g}$ is the revenue allocation factor representing the revenue to be allocated to the offshore source, and the variable $x3prtnrs_{m,p,g}$ is the revenue allocation factor representing the revenue to be allocated to the third-party partner source.

Note that $xASO_{m,p,g}$ (offshore revenue), $x3prtnrs_{m,p,g}$ (third-party partner revenue), and $xdrctw_{m,p,g}$ (number of contractors to hire) are decision variables to be assigned when the workforce optimization model is solved. Varying the values for these different sources of revenue allows the workforce optimization model to minimize (or otherwise reduce) costs associated with using external workforce, and also allows the model to increase utilization of the enterprise internal workforce.

The term $$\sum_{(m,r),(m',r') \in MRMR} TRAINCOST_{(m,r),(m',r')} * xtrain_{(m,r),(m',r')}$$

represents the cost of cross-training across different market offerings and different roles (from m to m' and from role r to r'). The parameter $TRAINCOST_{(m,r),(m',r')}$ represents the training cost for each individual from market offering m with role r to market offering m' with role r'. The parameter $qxtrain_{(m,r),(m',r')}$ is a decision variable that represents the number of people from market offering m, role r, to be trained for market offering m', role r'.

In Eq. 1, the term $$FLAGCAP * \varepsilon * \left( \sum_{\substack{r \in DR \\ (m,p,g) \in MPG}} xdrexcess_{r,m,p,g} + \sum_g xspexcess_g \right)$$

represents a value associated with keeping idle employees as excess inventory rather than assigning such employees to a particular market offering, practice, and geography when such assignment is not needed. Note that this term is a positive value to contribute positively to the gross margin. In actuality, such employees are usually not really idle, because they may be assigned to support roles for increasing the productivity of employees assigned to billable activities. Effectively, this term specifies that keeping internal workforce employees idle (rather than assigning them when not needed) increases gross margin. The parameter FLAGCAP having a true value indicates that the model is being run with capacity constraints; the parameter $\varepsilon$ has a value that represents a small incentive of leaving enterprise employees as idle inventory instead of allocating this inventory without real FTE requirements; the parameter $xdrexcess_{r,m,p,g}$ represents an idle internal workforce by role, market offering, practice, and geography; and the parameter $xspexcess_g$ represents an idle sales principal FTE by geography.

The workforce optimization model that is represented by Eq. 1 above, in accordance with some embodiments, is subject to various constraints, which are discussed below. Constraint (C1) is expressed as follows:

$$xinrev_{m,p,g} + xASO_{m,p,g} + x3prtnrs_{m,p,g} = FO2R_g * x4kord_{m,p,g}$$

where $xinrev_{m,p,g}$ is a decision variable (by market offering, practice, and geography) that represents the enterprise-owned revenue (revenue 204 in FIG. 2), $xASO_{m,p,g}$ represents the offshore revenue (revenue 206 in FIG. 2), and $x3prtnrs_{m,p,g}$ represents third-party partner revenue (revenue 208 in FIG. 2). The right-hand side of constraint (C1) represents the adjusted target revenue (box 202 in FIG. 2). Constraint C1 thus represents the division of the adjusted target revenue 202 in FIG. 2 among the three revenue sources (204, 206, 208).

Further constraints (C2) to be satisfied are set forth below:

$$xASO_{m,p,g} \geq FASO_{m,p,g} * x4kord_{m,p,g}$$

$$x3prtnrs_{m,p,g} \geq F3P_{m,p,g} * x4kord_{m,p,g}$$

which indicates that $xASO_{m,p,g}$ (the offshore revenue by market offering, practice, and geography) should be greater than or equal to $FASO_{m,p,g}$ (the percentage of revenue generated by offshore operations by market offering, practice, and geography) multiplied by the order revenue ($x4kord_{m,p,g}$) for orders by market offering, practice, and geography. Also, constraints (C2) specify that the revenue delivered by third-party partners ($x3prtnrs_{m,p,g}$) should be greater than or equal to $F3P_{m,p,g}$ (percentage of revenue delivered by third-party partners) multiplied by the order revenue ($x4kord_{m,p,g}$). The order revenue ($x4kord_{m,p,g}$) represents the gross revenue mentioned above by summing amounts of orders.

A further constraint (C3) is that the forecast order revenue ($x4kord_{m,p,g}$) should be less than or equal to MAX $4KORD_{m,p,g}$, which is the maximum forecast target revenue based on orders by market offering, practice, and geography. This constraint is expressed as $$x4kord_{m,p,g} \leq MAX\ 4KORD_{m,p,g}.$$

A further constraint (C5) is as follows:

$$[DRATE_g * \eta * (CORE_{m,p,g} * xftereq_{m,p,g}^{INT} +$$
$$(1 - BID_{m,p,g}) * xftereq_{m,pg}^{CTW} - RISK_{m,p,g} * xftereq_{m,p,g})] = xinrev_{m,p,g}$$

which is a calculation used for deriving the internal workforce FTE 216 of FIG. 2 (represented as $xftereq_{m,p,g}^{INT}$). In the constraint above, the parameter $CORE_{m,p,g}$ represents the core local workforce utilization according to market offering, practice, and geography. In other words, this is the percentage of the internal workforce FTE allocated to deliver services or goods. The parameter $BID_{m,p,g}$ represents the percentage of internal workforce FTE allocated to sell services or goods (by market offering, practice, and geography). Thus, $CORE_{m,p,g}$ and $BID_{m,p,g}$ differ in that the former represents the percentage of internal workforce that actually delivers the services or goods of the enterprise, whereas the latter represents the percentage of internal workforce FTE allocated to sell such services or goods. The parameter $RISK_{m,p,g}$ is a risk factor according to market offering, practice, and geography, which is a percentage of deliverable time that is not billable.

In constraint (C5), the term $CORE_{m,p,g} * xftereq_{m,p,g}^{INT}$ represents the contribution of the internal workforce to the enterprise-owned revenue $xinrev_{m,p,g}$ (204 in FIG. 2). The term $(1-BID_{m,p,g}) * xftereq_{m,p,g}^{CTW}$ represents the contribution of the contingent workforce to the enterprise-owned revenue, where $(1-BID_{m,p,g})$ represents the percentage of the contingent workforce that participates in delivering services or goods. The term $RISK_{m,p,g} * xftereq_{m,p,g}$ represents the amount of the total workforce that is not billable.

A further constraint (C6) is set forth as $$xftereq_{m,p,g}^{INT} + xftereq_{m,p,g}^{CTW} = xftereq_{m,p,g}$$

which basically states that $xftereq_{m,p,g}$ (214 in FIG. 2) is a sum of $xftereq_{m,p,g}^{INT}$ (internal workforce FTE 216) and $xftereq_{m,p,g}^{CTW}$ (contingent workforce FTE 218).

The FTE by role (for solution architects, business consultants, and technical consultants) is represented by $xdrreq_{r,m,p,g}$, where $r \in \{SA, BC, TC\}$, and the local FTE for project managers is represented as $xpmlocal_{m,p,g}$. The following constraint (C6) disaggregates $xftereq_{m,p,g}$ into FTEs for the different roles (solution architect, business consultant, and project manager:

$$\sum_{r \in SABCTC} xdrreq_{r,m,p,g} + xpmlocal_{m,p,g} = xftereq_{m,p,g}$$

Another constraint (C7) is $xpmlocal_{m,p,g} + xpmextra_{m,p,g} = xdrreq_{PM,m,p,g}$, which indicates that the FTE for the project manager role (represented as $xdrreq_{PM,m,p,g}$) is the sum of $xpmlocal_{m,p,g}$ (the local FTE for project managers) and $xpmextra_{m,p,g}$, which represents extra project managers that may be needed. As noted above, the $xpmextra_{m,p,g}$ is used to account for any inconsistency of allocating project manager FTE based on adjusted target revenue (202) and allocating project manager FTE based on disaggregation of the internal workforce FTE according to constraint (C6) above.

The following constraints define the business consultant FTE requirement (constraint C8), solution architect FTE requirement (constraint C9), and project manager FTE requirement (constraint C10), respectively:

$$xdrreq_{BC,m,p,g} = FBC_{m,p,g} * xftereq_{m,p,g};$$

$$xdrreq_{SA,m,p,g} = FSA_{m,p,g} * xftereq_{m,p,g};\ and$$

$$REVPM_g * xdrreq_{PM,m,p,g} = FO2R_{m,p,g} * FPR_{m,p,g} * x4kord_{m,p,g}.$$

Constraint (C8) basically specifies that the business consultant FTE, $xdrreq_{BC,m,p,g}$ (222 in FIG. 2), is calculated by multiplying $FBC_{m,p,g}$ (the percentage of internal workforce FTE to be allocated to business consultants). Constraint (C9) similarly assigns the solution architect FTE, $xdrreq_{SA,m,p,g}$ (220 in FIG. 2), based on $FSA_{m,p,g}$. In constraint (CI0) regarding the project manager FTE requirement, $REVPM_g$ represents the average revenue that is managed by project managers. Constraint (C10) allocates the project manager FTE, $xdrreq_{PM,m,p,g}$, according to the adjusted total revenue 202 and based on $FPR_{m,p,g}$, which represents percentage of revenue allocated to project managers by market offering, practice, and geography.

A further constraint (C11) to be satisfied is set forth below:

$$xdrint_{r,m,p,g} + xdrctw_{r,m,p,g} = xdrreq_{r,m,p,g} \quad r \in DR = (BC, SA, TC, PM)$$

$$\sum_r xdrint_{r,m,p,g} = xftereq_{m,p,g}^{INT}$$

$$\sum_r xdrctw_{r,m,p,g} = xftereq_{m,p,g}^{CTW}$$

which simply states that the sum of the internal workforce FTE requirement ($xdrint_{r,m,p,g}$) by role, market offering, practice, and geography and the contingent workforce FTE requirement ($xdrctw_{r,m,p,g}$) by role, market offering, practice, and geography is equal to $xdrreq_{r,m,p,g}$. Note that the last equation of constraint C11 specifies that the contingent workforce FTE value 218 in FIG. 2 is to be disaggregated among the various roles as done for the internal FTE value 216. Also, the constraint (C11) states that the sum of all variables $xdrint_{r,m,p,g}$ (over the different roles, marketing offerings, practices, and geographic areas) is equal to the internal workforce FTE requirement ($xftereq_{m,p,g}^{INT}$ or 216 in FIG. 2), and the sum of all variables $xdrctw_{r,m,p,g}$ (over the different roles, marketing offerings, practices, and geographic areas) is equal to the contingent workforce FTE requirement ($xftereq_{m,p,g}^{CTW}$ or 218 in FIG. 2).

A further constraint (C12) is expressed as:

$$xdrctw_{m,p,g} = FCTW_{m,p,g} * xdrreq_{r,m,p,g}$$

which indicates that for each market offering, practice, and geography, the contingent workforce FTE allocation factor ($FCTW_{m,p,g}$) has to be satisfied.

Another constraint (C13) to be satisfied includes:

$$xdrint_{r,m,p,g} + xdrexcess_{r,m,p,g} + \sum_{(m,r),(m',r') \in MRMR} xtrain_{(m,r),(m',r')} =$$

$$INTINV_{r,m,p,g} + \sum_{(m,r),(m',r') \in MRMR} xtrain_{(m',r'),(m,r)}$$

which indicates that internal workforce inventory constraints should be satisfied and training is to be allowed to improve local workforce utilization. Constraint C13 specifies that the sum of the internal workforce FTE by role, market offering, practice, and geography ($xdrint_{m,p,g}$), the idle internal workforce ($xdrexcess_{m,p,g}$), and the cross-trained workforce from (m,r) to (m',r') ($\Sigma xtrain_{(m,r),(m',r')}$) is equal to the sum of the available internal workforce inventory ($INTINV_{r,m,p,g}$) by role, market offering, practice, and geography and the cross-trained workforce from (m',r') to (m,r). The internal workforce inventory ($INTINV_{r,m,p,g}$) by role, market offering, practice, and geography represents the internal workforce capacity of the enterprise.

Also, another constraint (C14) to be satisfied is that the idle workforce by role, market offering, practice, and geography should not exceed the inventory available as represented by $INTINV_{r,m,p,g}$: $xdrexcess_{r,m,p,g} \le INTINV_{r,m,p,g}$.

Note that in other implementations, not all constraints have to be used. For example, the workforce optimization model can be used in various modes, where different combinations of constraints can be used in the different modes.

Figure 3:
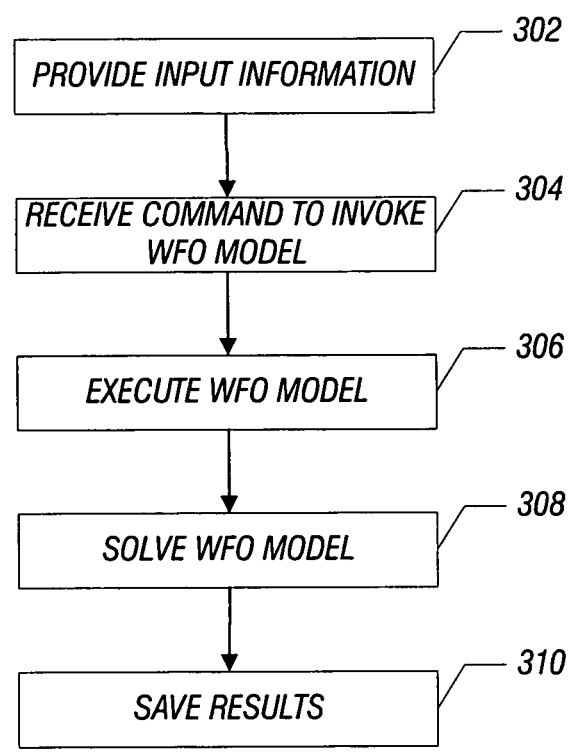
FIG. 3 is a flow diagram of performing a workforce optimization process, according to an embodiment.

FIG. 3 illustrates a planning process according to an embodiment. Initially, input information is provided (at 302), which includes input information 114 depicted in FIG. 1. The input information can be provided by a user at the client station 120, or alternatively, the input information may have been pre-stored or communicated in one or more files from another source.

Next, in response to receiving (at 304) a command to invoke the planning tool 102, such as by activating a GUI icon in the client station 120, the planning application 104 in the planning tool 102 invokes (at 306) the workforce optimization model 110. This involves the modeling software 106 executing the workforce optimization model 110, with the modeling software 106 invoking the solver 108 to solve (at 308) the workforce optimization model 110 to provide output information 112. The results are saved (at 310), either in the application server 100 or the database server 124, as depicted in FIG. 1.

The results generated can include post-processing of values assigned to the decision variables by the solver 108 to produce output information in the format desired by the user. The output data can include the following: allocation of revenue to the various sources (enterprise-owned source, third-party partner source, and offshore source). The gross margin can also be provided as an output, where the gross margin is the target revenue less the operational cost. Further output data can include the internal workforce FTE, contingent workforce FTE, cross-trained FTE, and any of the decision variables of the workforce optimization model discussed above.

Cost data can also be output, including internal FTE cost, contingent workforce FTE cost, offshore workforce cost, third-party partner workforce cost, and cross-training cost.

Allocation factors can also be provided as output, including the percentages of revenue to be fulfilled by offshore workforce, third-party partner workforce, and contingent workforce. Further outputs can include workforce-related percentages, including utilization percentage, and others.

By using the workforce optimization model according to some embodiments, workforce can be allocated to meet target revenues while maximizing (or otherwise enhancing) profitability of the enterprise, by considering costs associated with using various workforce sources (contingent, offshore, and third-party partner). By treating the enterprise's internal workforce as a sunk cost, the workforce optimization model seeks also to enhance utilization of the internal workforce, since increased utilization is not associated with additional costs. Also, any gaps in the workforce are filled automatically as part of solving the workforce optimization model, by computing the revenues to be produced by the offshore workforce and the third-party partner source, and by computing the internal and contingent workforce FTEs.

Moreover, cross-training opportunities are considered to provide flexibility of using internal workforce to fill other market offerings and roles by cross-training. Also, the workforce optimization model provides a top-down approach to allow for creation of an enterprise-wide plan that can be distributed to various organizations for use in developing local revenues and budgets. In turn, the organizations can use the workforce optimization model to develop a regional plan.

Instructions of software described above (including the software tool 102, planning application 104, modeling software 106, and solver 108 of FIG. 1) are loaded for execution on a processor (such as one or more CPUs 118 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An enterprise resource planning method comprising:
   receiving, by a tool executing in a system having a processor, parameters relating to: a target enterprise objective associated with an enterprise based on forecast activity of the enterprise; a cost of an internal workforce of the enterprise; a capacity of the internal workforce; and a cost of an external workforce; and
   calculating, by the tool, an amount of the internal workforce and an amount of the external workforce to be assigned based on the received parameters relating to the target enterprise objective, the cost of the internal workforce, the capacity of the internal workforce, and the cost of the external workforce, wherein calculating the amounts of the internal workforce and the external workforce uses a model that takes into account the received parameters and that enhances utilization of the internal workforce and a gross margin of the enterprise, wherein the model maximizes the utilization of the internal workforce.

2. The method of claim 1, wherein calculating the amounts of the internal workforce and the external workforce comprises calculating the amounts using a linear programming model that takes into account the received parameters.

3. The method of claim 1, wherein calculating the amount of the internal workforce comprises calculating a number representing a full-time equivalent of the internal workforce of the enterprise.

4. The method of claim 3, further comprising calculating a full-time equivalent of a contingent workforce of the enterprise, wherein the contingent workforce is part of the external workforce.

5. The method of claim 1, further comprising disaggregating the amount of the internal workforce into plural sub-amounts corresponding to different roles of the internal workforce.

6. The method of claim 1, wherein calculating the amount of the internal workforce comprises calculating the amount of the internal workforce for a particular segment of the enterprise.

7. The method of claim 6, wherein calculating the amount of the internal workforce for the particular segment of the enterprise comprises calculating the amount of the internal workforce for at least one of a market offering, practice, and geographic area of the enterprise.

8. The method of claim 1, further comprising:
   receiving a parameter relating to a cost of cross-training workforce personnel; and
   calculating a variable indicating a number of workforce personnel to cross-train from one role to another role using the model that further takes into account the cost of cross-training.

9. The method of claim 1, wherein the target enterprise objective comprises a target revenue of the enterprise, the method further comprising calculating at least one allocation factor to allocate at least a portion of the target revenue of the enterprise to at least one of an offshore source and a third-party partner source, wherein the external workforce is provided by the at least one of the offshore source and the third-party partner source.

10. The method of claim 1, wherein calculating the amounts of the internal workforce and external workforce to be assigned is part of a process to fill a gap between the capacity of the internal workforce and an enterprise resource requirement based on the target enterprise objective.

11. The method of claim 1, wherein the external workforce includes a contingent workforce and personnel of a third party.

12. An enterprise resource planning method comprising:
   receiving, by a tool executing in a system having a processor, parameters relating to: a target enterprise objective associated with an enterprise based on forecast activity of the enterprise; a cost of an internal workforce of the enterprise; a capacity of the internal workforce; and a cost of an external workforce; and
   calculating, by the tool, an amount of the internal workforce and an amount of the external workforce to be assigned based on the received parameters relating to the target enterprise objective, the cost of the internal workforce, the capacity of the internal workforce, and the cost of the external workforce, wherein calculating the amounts of the internal workforce and the external workforce uses a model that takes into account the received parameters and that enhances utilization of the internal workforce and a gross margin of the enterprise, wherein calculating the amounts of the internal workforce and the external workforce to be assigned is based on the model that further takes into account a parameter to indicate that excess internal workforce is to be kept idle if allocation is not needed.

13. A method comprising:
   providing a workforce allocation model that takes into account target revenue information, cost information of an internal workforce of an enterprise, cost information of an external workforce, and a capacity of the internal workforce of the enterprise; and
   solving, by a system having a processor, the workforce allocation model that enhances profitability of the enterprise and that enhances utilization of the internal workforce to determine an amount of the internal workforce and an amount of the external workforce to assign, wherein solving the workforce allocation model comprises:
      determining that a workforce gap cannot be filled with the internal workforce; and
      allocating a portion of the target revenue to an external vendor in response to determining that the workforce gap cannot be filled with the internal workforce, wherein the external workforce is provided by the external vendor.

14. The method of claim 13, wherein providing the workforce allocation model comprises providing the workforce allocation model that further takes into account training opportunities to cross-train internal workforce members across different roles.

15. A non-transitory computer-readable storage medium storing instructions that when executed cause a computer to:
   receive parameters relating to: a target enterprise objective associated with an enterprise based on forecast activity of the enterprise; a cost of an internal workforce of the enterprise; a capacity of the internal workforce; and a cost of an external workforce; and
   calculate an amount of the internal workforce and an amount of the external workforce to be assigned based on the received parameters relating to the target enterprise objective, the cost of the internal workforce, the capacity of the internal workforce, and the cost of the external workforce, wherein calculating the amounts of the internal workforce and the external workforce uses a model that takes into account the received parameters and that enhances utilization of the internal workforce and a gross margin of the enterprise, wherein the model maximizes the utilization of the internal workforce.

16. The computer-readable storage medium of claim 15, wherein the instructions when executed cause the computer to further:
   calculate a variable indicating a number of workforce personnel to cross-train from one role to another role using the model that further takes into account a cost of cross-training.

* * * * *